United States Patent

[11] 3,628,879

[72] Inventors Frank E. Marmon
Marietta;
Alan B. Shimell, Atlanta, both of Ga.
[21] Appl. No. 5,252
[22] Filed Jan. 23, 1970
[45] Patented Dec. 21, 1971
[73] Assignee Lockheed Aircraft Corporation
Burbank, Calif.

[54] JET PUMP
4 Claims, 2 Drawing Figs.

[52] U.S. Cl. .................................................. 417/176
[51] Int. Cl. ................................................... F04f 5/00
[50] Field of Search............................................ 417/176,
175, 163, 174; 60/39.49

[56] References Cited
UNITED STATES PATENTS

| | | | |
|---|---|---|---|
| 1,771,988 | 3/1930 | Anderson | 417/176 X |
| 1,845,675 | 2/1932 | Martin | 417/176 X |
| 2,041,803 | 5/1936 | Wolf | 417/176 X |
| 2,558,483 | 6/1951 | Goddard | 60/39.49 UX |

Primary Examiner—Carlton R. Croyle
Assistant Examiner—Richard E. Gluck
Attorneys—John J. Sullivan and George C. Sullivan ABSTRACT: This jet pump comprises an ejector manifold adapted for connection between a single source of pressurized fluid and multiple scavenge lines from different fuel tanks or storage areas whereby all of the fuel is withdrawn from all such areas with the pressurized fluid for ultimate delivery to one or more engines. By using a common ejector manifold the duplication of parts, lines and fittings is held to a minimum and a more efficient scavenge system results.

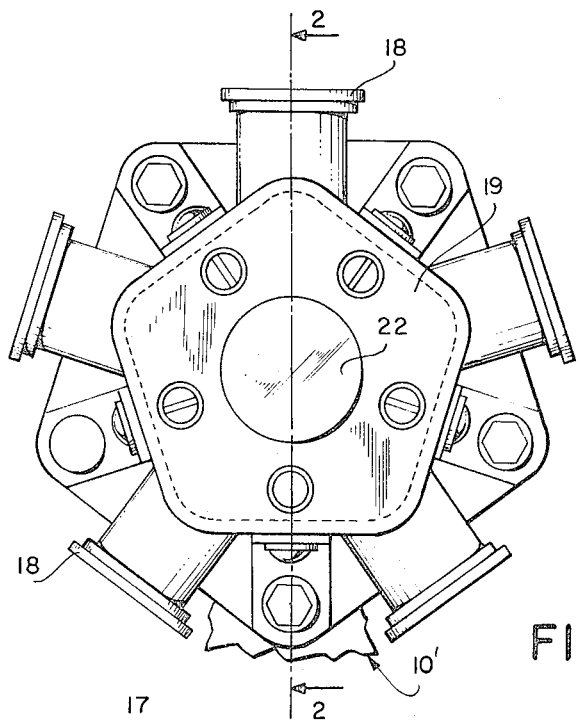
FIG_1
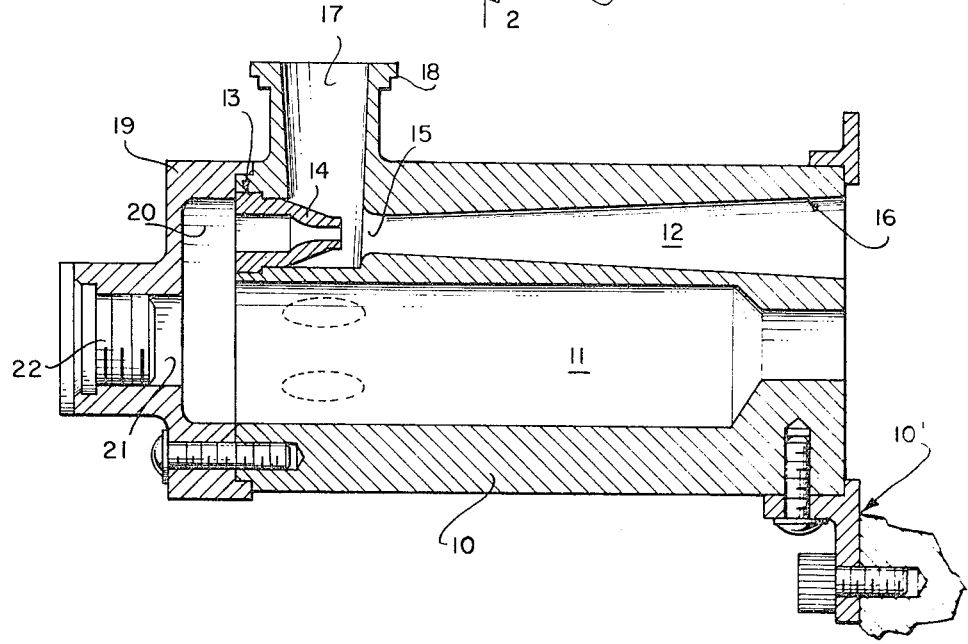
FIG_2
INVENTORS
FRANK E. MARMON
ALAN B. SHIMELL

JET PUMP

This invention relates to jet pumps as employed to withdraw or force liquid from and to selected places or areas and more particularly to a jet pump capable of removing liquid from several, separate areas simultaneously using a single pressure source. Where employed in fuel systems of vehicles to deliver fuel from multiple storage tanks or from different sections of the same tank into the feed system for the engine or engines where it is ignited in the combustion process to produce the motive power for the vehicle, the jet pump herein proposed affords a compact package to reduce the number of components required for such a scavenge system.

While the invention is generally applicable to all scavenge systems, it has particular utility in aircraft where large quantities of fuel are presently required on board in multiple interconnected tanks or containers. During operation of the aircraft as the fuel from the several tanks is being depleted, it is important that the drain be equally spread over all of the tanks for ballast purposes, and that a continuous flow of fuel be supplied to the engine or engines.

At the same time, it is important that all of the fuel in all of the tanks be ultimately expended so that a residue or unusable fuel is not left in any of the tanks where it would add to the base weight of the aircraft. Moreover, unused fuel in various tanks could conceivably cause an imbalance of aircraft CG requiring a correction through trim.

In order to avoid the above adverse and undesirable results, jet pumps have been employed in all tanks with scavenge tubes appropriately located and interconnected plumbing to schedule and control fuel flow to the engine. As the size of aircraft increases, the number of necessary components, lines and fittings becomes unduly large introducing not only a weight problem, but also complex ducting and flow patterns requiring reliable controls therefor. Also, the cost for multiple parts and their installation is not to be ignored.

The present invention is directed to improvements in such operation by the provision of a reliable, compact pump comprised of a single manifold adapted to operatively connect on the one hand an unlimited number of scavenge tubes, the remote ends of which may be strategically located in an optimum manner in the fuel tank or tanks, and on the other hand a source of fluid pressure which passes through the manifold in such a manner as to simultaneously draw fuel from all areas of the tank or tanks. As the fuel is thus drained from each area, each scavenge tube in that particular area will commence to draw or suck air while the tubes in other areas containing fuel will continue to be effective to satisfy the requirements of the engine. The aggregate motive flow and induced flow as described is discharged through the common manifold and ultimately into and through a fuel duct to the engine.

As a result of the pump structure as herein proposed, redundant lines and/or plumbing and parts are avoided resulting in appreciable cost savings. Also, a comparatively uncomplicated system is provided reducing maintenance requirements and increasing reliability. Aggregate weight at the same time is held to a minimum. More specifically, the instant pump comprises in essence a plurality of independent venturis disposed in substantially coextensive position around a single central duct. One end of this central duct terminates in communication with the interior of a plenum which also communicates with one end of each individual venturi. At its opposite end, The central duct connects to a main fluid pressure source (not shown) which may be any conventional type, while the opposite ends of each venturi connects to a fuel discharge port. All such ports may, if desired, be operatively connected to a fuel line to the feed system for the aircraft engine or engines.

With the above and other objects in view as will be apparent, this invention consists in the construction, combination, and arrangement of parts all as hereinafter more fully described, claimed and illustrated in the accompanying drawings, wherein:

FIG. 1 is an end elevation of a jet pump designed and constructed in accordance with the teachings of this invention to show primarily the end thereof containing the plenum and the relationship of the several scavenge tube connection ports therewith; and FIG. 2 is a section taken along line 2—2 of FIG. 1 to show the longitudinal cross section of the jet pump and the relationship of each venturi and its associated scavenge tube connection port to the central duct and plenum.

Referring more particularly to the drawings, 10 designates a housing which comprises the body of the present jet pump assembly which is adapted to be located in a selected position, as for example by mounting as at 10' to associated, relatively stationary structure. This housing is generally rectangular in shape (FIG. 2) and is pierced centrally by a bore 11. Disposed about the center bore 11 are a plurality of longitudinal bores 12, a total of five being indicated in the illustrated form as the preferred number, and located so as to be substantially parallel one to the other and coextensive in length with the central bore 11. Each of these outer bores 12 is enlarged at one end 13 and adapted to receive therein a nozzle fitting 14 with a neck 15 being provided in the bore adjacent the nozzle 14. The dimension of each bore 12 preferably tapers outwardly as at 16 at the other end of the housing 10.

A transverse port 17 is provided in that end of the housing 10 adjacent each neck 15 and nozzle 14 which port 17 terminates in an appropriate fitting 18 adapted to receive the end of a scavenge line (not shown) to be connected thereto. The large end of each outer bore 12 is adapted to be connected to a fuel discharge line (not shown) which ultimately communicates with the engine or engines. The corresponding end of the center bore 11 is also adapted to connect in any conventional manner a fuel pressure source line for the delivery of pressurized fluid to the bore 11.

At its other end, the housing 10 is closed by an end cap 19 which may be secured and sealed in conventional manner and internally defines a plenum 20 which communicates with the central bore 11 as well as the adjacent end 13 of each outer bore 12 and nozzle 14. This cap 19 may be, if desired, tapped centrally by a bore 21 and closed by an end plug 22. This feature allows for the connection when desired of the fuel pressure source line at this end and closure of the opposite end of the center bore 11 by a plug connection similar to the plug 22 so that the jet pump can be made to operate from either end.

Also, where a series connection of several pumps as herein proposed is desired the pressure fluid can be made to pass through the central bore 11 entering at one end and leaving the other end. In this case a predesign of the pressure and relative dimensions of bore 21, plenum 20, bores 12, etc., the pump would perform as described.

With the jet pump installed as above described fluid under pressure is forced through the center bore 11 into the plenum 20 and out through each of the jet nozzles 14 and venturi tubes 12 to the engine feed system. A suction pressure is thereby created in each venturi tube 12 and fuel is made to pass from the several remote areas through the respective scavenge ports 17 to be carried along through the venturi tube 12 to the engine feed system. In this way, all of the fuel from each of the remote tank areas is ultimately delivered to the engine or engines. As each of these areas becomes depleted, being independently connected through its respective port to its respective venturi 12, the end of each scavenge tube submerged in fuel will continue to draw while the depleted areas will merely ineffectively draw or suck air.

While a specific embodiment of the invention has been disclosed herein, it is to be understood that numerous adaptations, modifications, and substitutions may be utilized without departing from the scope of the invention.

What is claimed is:

1. A jet pump adapted to simultaneously draw fuel from multiple remote areas for discharge into a common comprising:

a plurality of independent venturis disposed in substantial coextensive position relative to a common duct;

a plenum common to all of said venturis adjacent corresponding ends thereof and also common to said duct;

a jet nozzle associated with each venturi adjacent said plenum;

an individual port in communication with each venturi proximate the associated nozzle, each said port being adapted to connect a scavenge tube, the remote end of which is located in a fuel-filled area; and a source of pressurized fluid connected to one end of said duct whereby pressurized fuel passing into said duct enters the plenum passing equally through each nozzle and associated venturi drawing with it fuel from each said tube.

2. The pump of claim 1 wherein said venturis are disposed in substantially a circle around said duct.

3. The pump of claim 2 wherein both ends of said duct are open, the end thereof opposite the source of fluid connected end aforesaid being closed by a removable plug.

4. The pump of claim 2 including five venturis.

* * * * *